Patented Mar. 11, 1930

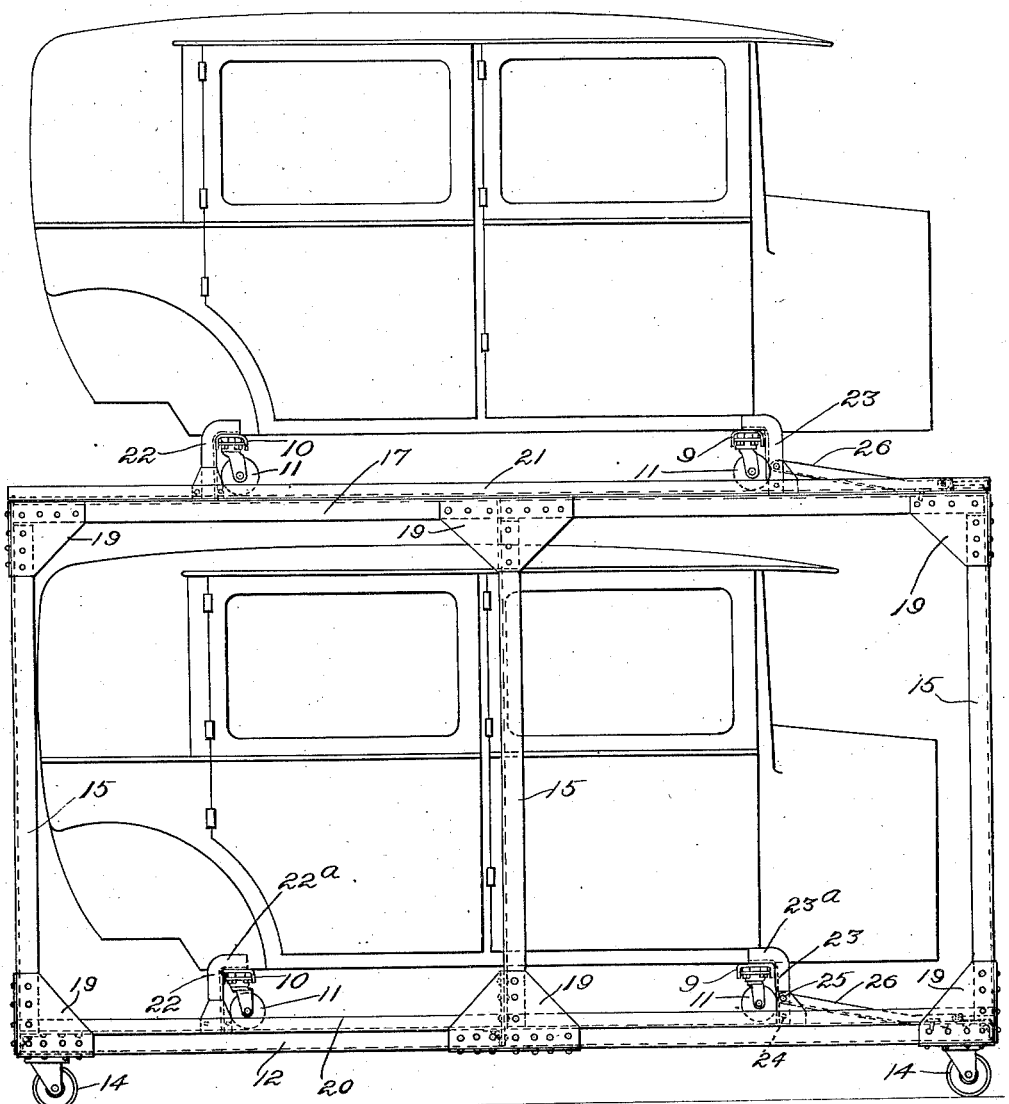

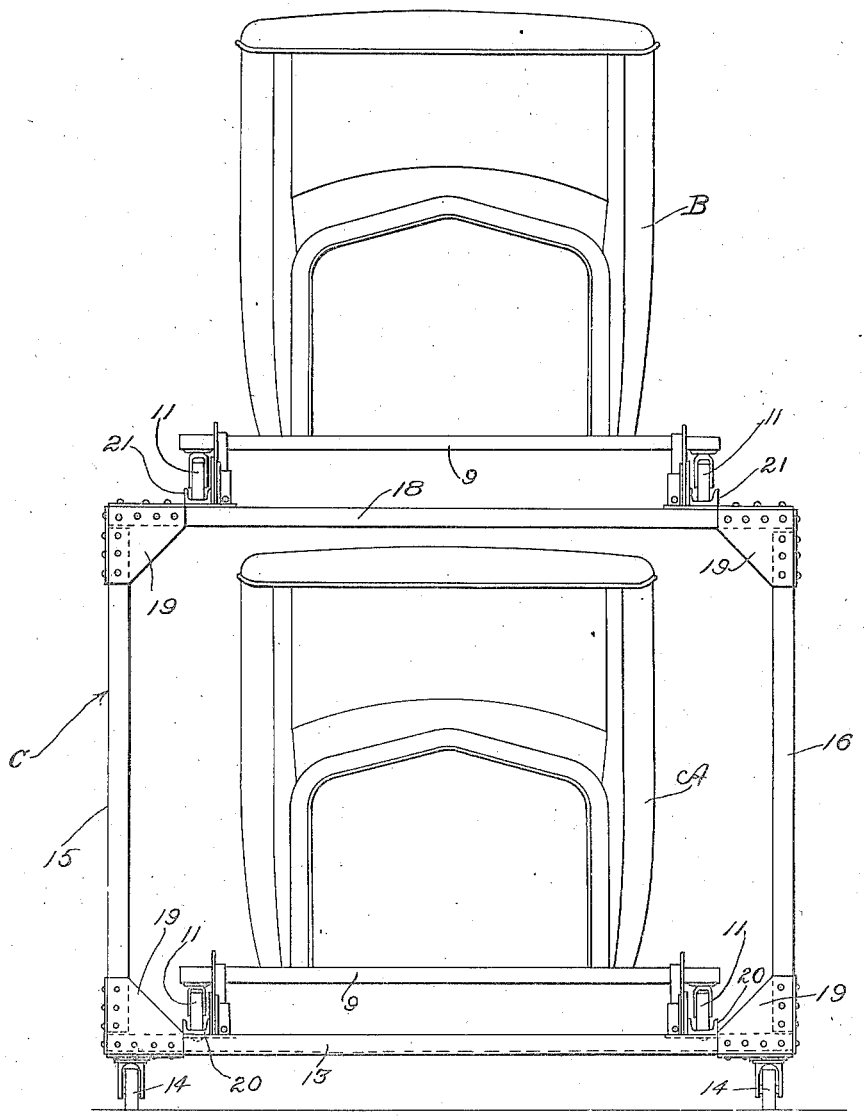

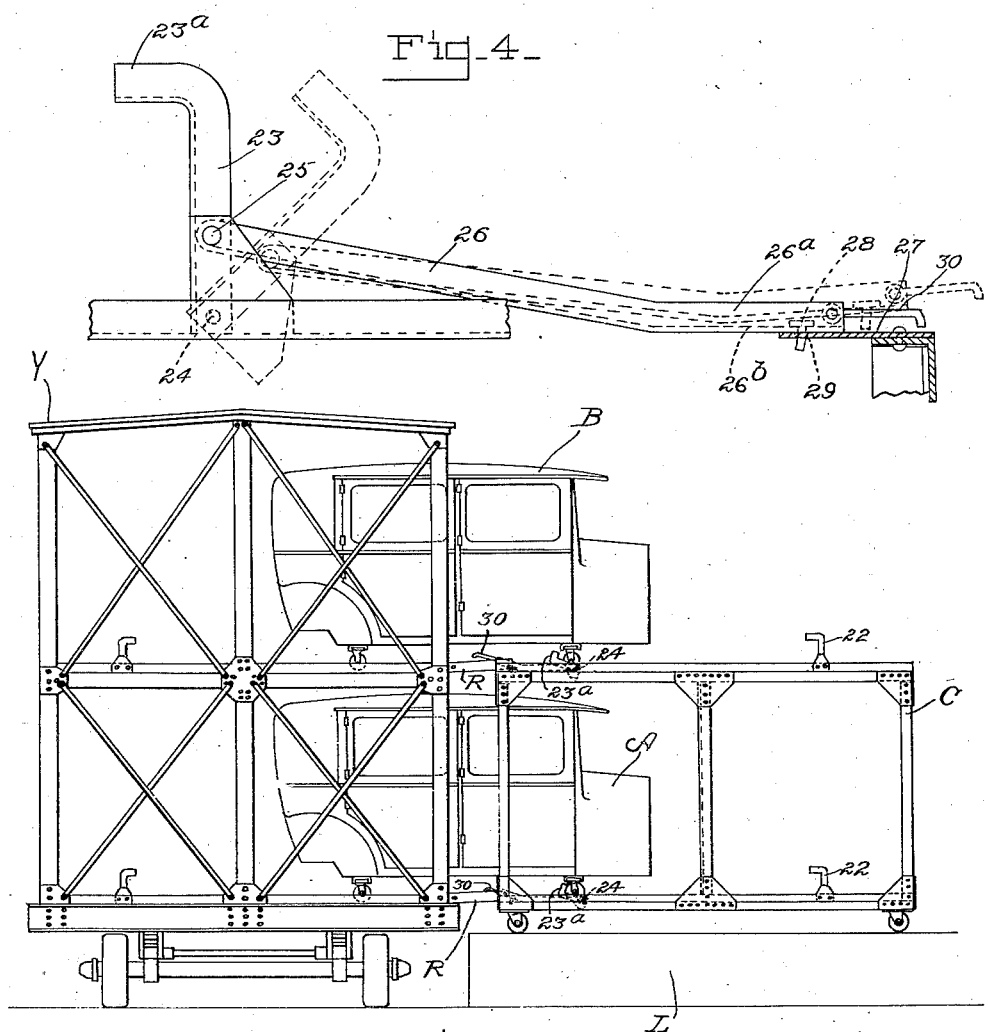

1,750,129

UNITED STATES PATENT OFFICE

ROBERT T. ROMINE, OF MOUNT CLEMENS, MICHIGAN, ASSIGNOR TO HUDSON MOTOR CAR COMPANY, OF DETROIT, MICHIGAN, A CORPORATION OF MICHIGAN

AUTOMOBILE BODY HANDLING

Application filed October 12, 1926, Serial No. 141,133. Renewed July 25, 1929.

This invention relates to the handling, transporting and storing of automobile bodies, the invention having for one of its objects the handling of automobile bodies in such manner as to require half the floor or ground space heretofore required for moving, storing or housing bodies during production in factories, plants or storage places, and wherein a considerable saving in labor is made as well as enabling the bodies to be moved and conveyed from point to point more rapidly and easily and with less danger of marring, scratching or otherwise damaging the bodies where they are enamelled or painted.

Another object of the invention is to enable twice as many bodies to be accommodated at one time in the bake-off ovens, or at many other stages of production, thereby enabling under many prevailing conditions at plants, twice the bodies to be worked on in the same time, space, and with the same labor as heretofore.

Other objects of this invention will appear in the following description and appended claims, reference being had to the accompanying drawings illustrative of the invention, wherein like reference characters designate corresponding parts in the several views.

Fig. 1 is a side elevation showing a portable rack or truck for carrying the bodies in double-deck relation.

Fig. 2 is a front end elevation of the construction shown in Fig. 1.

Fig. 3 is a side elevation illustrating the unloading of the bodies double-deck from a double-deck trailer or conveyance.

Fig. 4 is a detail view showing one of the swinging locking members.

Before explaining in detail the present invention, and the method or mode of operation embodied therein, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended or the requirements of the prior art.

The handling of automobile bodies in body plants and automobile plants, the transportation of finished bodies from body plants to factories where the bodies are assembled on the chassis of the cars, the movement of the bodies in the plants during process, the storage of finished or partly finished bodies and the movement of the bodies to or from the storage places has heretofore been done at great expense, labor and time. Considerable manual labor has been required in handling bodies during process. The bodies are often dragged from point to point, are lifted and deposited at successive stages in production or transportation, and special equipment is required for lifting or hoisting bodies from point to point. Considerable valuable floor space must be allotted to the storage of a supply of bodies in advance of production requirements. Furthermore, the bake oven capacity in plants has been limited at any given time to the number of bodies occupying a given floor space or area.

One of the features of the present invention is to enable twice as many bodies to be handled, loaded, unloaded or conveyed at one time, and twice as many bodies to be stored or operated upon in the same floor space as heretofore, and twice as many bodies to be accommodated in the bake-off ovens as heretofore as well as eliminating considerable labor and time in the movement of bodies during process or stages of production or transportation.

In Fig. 3 I have illustrated by way of example a stage in the handling of bodies where the bodies may for instance be transported from a body plant to the assembly plant on a conveyance such as a double-deck trailer Y. A preferred construction of this trailer is shown and described in my co-pending application Serial No. 133,375, filed September 3, 1926. According to said application the trailer is constructed with upper and lower decks and a number of bodies such as eight may be carried on each deck, enabling such a vehicle to carry at one time as many as sixteen bodies. Each upper and lower body A and B is mounted on a pair of front and rear so-called paint sticks or caster bars 9 and 10, each of these paint sticks as described in my above application comprising an inverted channel bar carrying at opposite ends thereof a pair of swivelled caster wheels 11. The channel bar of each paint stick is detachably connected to the bottom of the body so that the bodies may be readily moved from place to place on the floors of the plant on the caster wheels 11.

In Figs. 1 and 2, I have illustrated a portable rack or conveyance constructed in such manner as to enable two bodies to be carried at one time in double-deck relation. This portable device or conveyance in the present instance comprises a skeleton frame C constructed to house within the frame the lower body A and also constructed to carry on the top of the frame the upper body B. The frame C is made up of a base comprising longitudinal side bars 12 preferably of angle iron construction which are connected together at opposite ends by means of transverse angle iron or structural bars 13. The front and rear transverse bars 13 each carries a pair of swivelled casters 14 at opposite ends thereof which may of any suitable construction.

Mounted on the base frame members 12 and 13 at opposite sides of the rack are a plurality of upright frame members 15 and 16 also preferably of angle iron construction, and these sets of frame members are connected at the top by means of a frame comprising lengthwise extending side bars 17 and end bars 18. The several top, side and bottom frame members forming the frame work of the rack are suitably connected together at their joints by means of gusset plates 19, thereby providing a strong, rigid and relatively light portable rack or frame.

Mounted on the bottom frame members 13 of the frame interiorly thereof are a pair of spaced parallel channel members 20 which are secured thereto. These channel members are spaced apart a distance suitable to accommodate the caster wheels 11 of the paint stick bars and to form guides therefor. It will thus be seen that an automobile body previously mounted on front and rear caster bars 9 and 10 may be moved on its caster wheels directly into the interior of the skeleton frame C with the caster wheels 11 travelling in the guide channels 20.

Mounted on the upper frame members 18 of the rack are a pair of spaced parallel channel members 21 similar in construction to the members 20. These upper channel members are also spaced apart a suitable distance to accommodate the caster wheels 11 of the front and rear paint sticks on which the upper body B is detachably mounted. It will, therefore, be seen that the upper body B may be rolled on to the top of the rack frame C with the caster wheels 11 travelling in the spaced guide channels 21. It will be understood that the upper and lower guides 20 and 21 with their flanges act to confine the caster wheels of the paint sticks, guide them in the proper direction and prevent the caster wheels from swivelling and getting out of alinement.

Means is provided for releasably locking each of the upper and lower bodies in position on the frame, and this means in the present embodiment of the invention is identical for each upper and lower body and comprises fixed locking members and releasable locking members. The upper and lower sets of locking members are identical and therefore a description of one set suffices in each instance.

Secured to the inner side of each of the channel guides 20 and 21 adjacent the rear end of the frame C is an abutment 22, see Fig. 1. This member 22 is formed from an angle iron bar having an upstanding vertical portion and a forwardly extending bend portion 22$^a$ forming a hook adapted to fit over the rear caster bar 10. Each member 22, two being provided for each of the upper and lower bodies, is herein termed for convenience a locking member and acts as an abutment or stop against which the rear paint stick bars 10 engage when the body is rolled on to the frame, thereby limiting the movement of the body. A pair of front locking members are provided for each of the upper and lower paint sticks 9. Each of said front locking members comprises an angle iron member 23 bent rearwardly at its upper end 23$^a$ to provide a hook similar to the rear locking member 22. The locking member 23 is pivoted at its lower end 24 to one of the guide channels 20 or 21. Pivoted at 25 to each member 23 at a point above the pivot 24 is a forwardly extending operating link 26. This link 26 is formed from an angle iron bar and the forward end of the link is bent to provide a horizontal portion 26$^a$ adapted to rest on a flat horizontal gusset plate 27, riveted to the adjacent frame members. The flange 26$^b$ of the angle iron link 26 forms a flat surface adapted to slide on the gusset plate 27. A depending locking pin 28 is secured to the flange 26$^b$ near the free end thereof and this pin is adapted to drop into a hole 29 in the plate 27. Secured to the end of the operating link 26 is a rod 30 forming a handle by means of which the operator may raise the free end of the link 26 so as to withdraw the pin 28 from the hole 29. Thereupon the operator may pull the link 26 forwardly thereby swinging the locking member 23 downwardly to the dotted line position shown in Fig. 4. In this manner the swinging locking members 23 may be swung away from the front caster bars 9 and below the plane of these bars to permit the body to be rolled forwardly off the frame, it being understood that the locking members 23 will be swung low enough so that the front and rear paint stick bars 9 and 10 will clear these locking members.

Referring to Fig. 3, I have illustrated one manner of unloading and loading automobile bodies in double-deck relation. The trailer Y is run into position alongside the loading dock L or other suitable platform. The portable rack C is moved into position adjacent a pair of double-deck compartments of the trailer as shown in Fig. 3. The lower and upper bodies A and B are then rolled out of the trailer on to the frame C. It will be understood with reference to my above mentioned application that the trailer is provided with swinging channel ramps adapted to be swung down into position to bridge the space between the trailer and the loading rack C, so that the bodies can be rolled from the trailer directly on to the loading rack C in double-deck relation. As above described the caster wheels on which each of the bodies is mounted will travel through the channel guides 20 and 21 until the rear paint sticks 10 engage the upper and lower deck fixed abutments or locking members 22, which will hook over the paint stick bars at opposite ends thereof. At this point the operator swings the locking members 23 upwardly so that the portions 23ª will hook over the front paint sticks 9, while the vertical portions of the locking members 23 will engage the paint stick bars 9 so as to clamp the front and rear paint sticks tightly between the front and rear pairs of locking members. The locking pins 28 are then inserted or dropped into the holes 29 resulting in firmly holding the paint stick bars for each body in position and preventing forward or rear movement of the caster wheels. In addition it will be noted that the flanges of the channel guides 20 and 21 will prevent any substantial turning or swivelling movement of the caster wheels. After the bodies have been loaded double-deck on the rack C, the latter may be readily pushed or conveyed to any desired point in the plant.

It will be understood that the bodies may be loaded double-deck on the rack C from elevators or from a freight car or in any other manner, the construction in Fig. 3 being merely illustrative of the invention. It will be further seen that the bodies may be moved about on the floors of the plant by means of the portable rack C while at the same time occupying but slightly more floor space than heretofore required for a single body. The bodies in double-deck relation may be moved on the rack C directly into the bake-off ovens so that two bodies may be baked at one time in the same place as where heretofore but a single body could be baked. In addition it will be noted that the bodies may be moved in double-deck relation on the rack C directly to the upper and lower runs of conveyors which carry the bodies to the trim lines where the upholstery is assembled or other finishing work done on the bodies. Where heretofore a given amount of floor space was required for storing bodies during production, by virtue of this invention but half this space is required for storing the same number of bodies, thereby enabling considerable floor space to be liberated for other uses in the plant. In addition it will be noted that the bodies may be loaded and unloaded double-deck without requiring any special handling equipment, such as hoisting devices, and that the movement of the bodies is greatly simplified, eliminating considerable labor and eliminating much of the danger heretofore prevalent in marring or damaging the finished surface of the bodies.

What I claim is:

1. A portable conveyance for moving two bodies at a time one above the other, wheels for supporting the conveyance adjacent the floor, said conveyance comprising a skeleton frame of a size to enclose the lower body, the top of said frame forming an upper deck for supporting the upper body, a pair of caster carrying bars for supporting each body, and devices for locking the caster carrying bars for each body in fixed relation to the frame.

2. A portable conveyance for moving two bodies at a time one above the other, wheels for supporting the conveyance adjacent the floor, said conveyance comprising a skeleton frame of a size to enclose the lower body, the top of said frame forming an upper deck for supporting the upper body, caster carrying bars for supporting the bodies, and devices cooperating with the caster bars of the upper and lower bodies for locking said bodies in fixed relation to the frame.

3. The combination of a portable conveyance for moving two bodies at a time one above the other, wheels for supporting the conveyance adjacent the floor, said conveyance comprising a frame of a size to enclose the lower body and having an upper deck for supporting the upper body, caster carrying members for supporting the bodies, and means including swinging devices for locking the caster carrying members and frame together.

4. The combination of a portable conveyance for moving two bodies at a time one above the other, wheels for supporting the conveyance adjacent the floor, said conveyance comprising a frame of a size to enclose the lower body and having an upper deck for supporting the upper body, caster carrying members for supporting each body, and means for locking the bodies to the frame including stationary devices cooperating with certain of the caster carrying members and swinging devices cooperating with the others.

In testimony whereof I affix my signature.

ROBERT T. ROMINE.